P. MEYER.
SCALE WITH AUTOMATICALLY ISSUED RECORD CARDS.
APPLICATION FILED AUG. 3, 1909.
991,343.
Patented May 2, 1911.
4 SHEETS—SHEET 1.
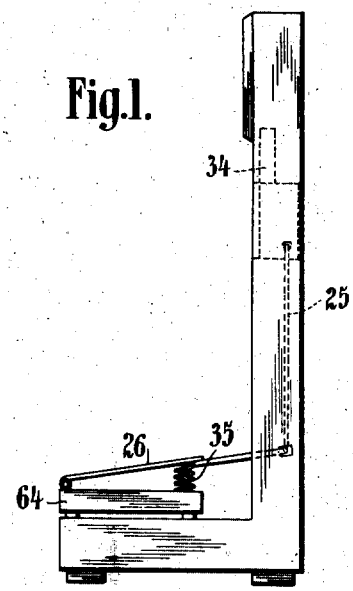
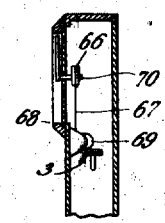
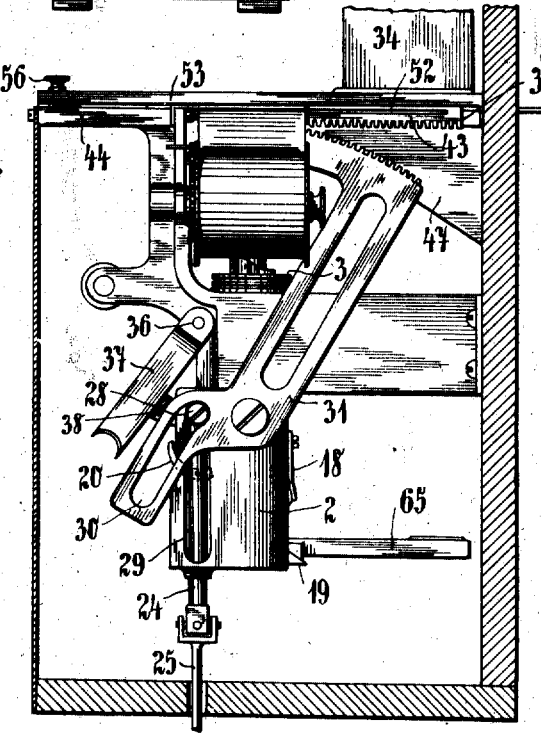
WITNESSES
L. H. Grote
A. E. Powell
INVENTOR
PETER MEYER
by Howson and Howson
Attorneys P. MEYER.
SCALE WITH AUTOMATICALLY ISSUED RECORD CARDS.
APPLICATION FILED AUG. 3, 1909.

991,343.

Patented May 2, 1911.

INVENTOR
PETER MEYER

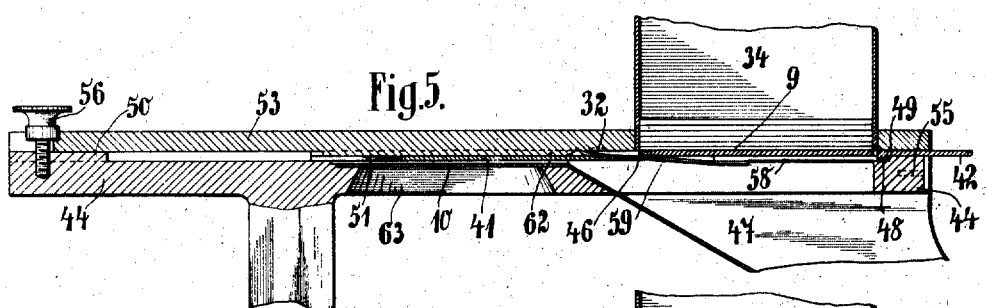

P. MEYER.
SCALE WITH AUTOMATICALLY ISSUED RECORD CARDS.
APPLICATION FILED AUG. 3, 1909.
991,343.
Patented May 2, 1911.
4 SHEETS—SHEET 4.
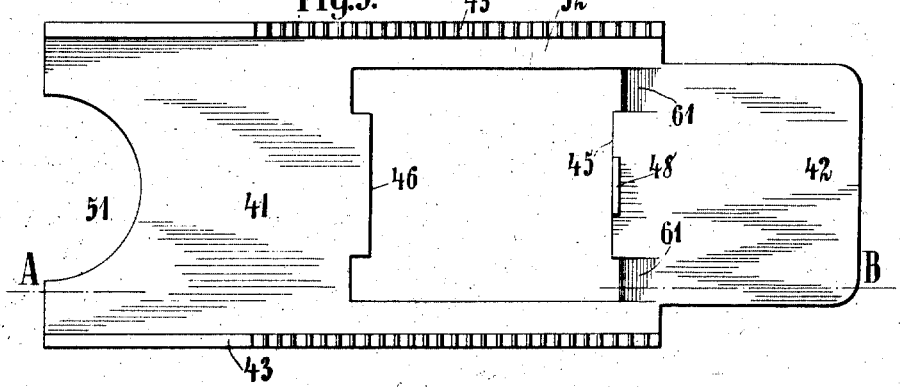
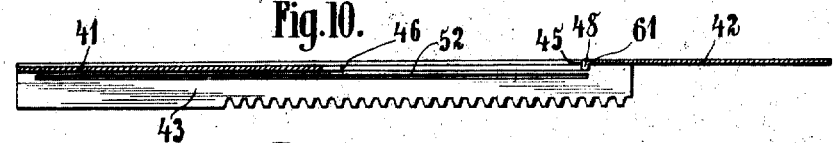
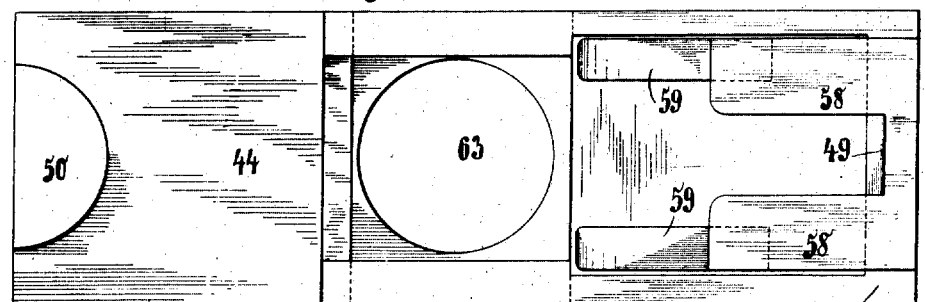
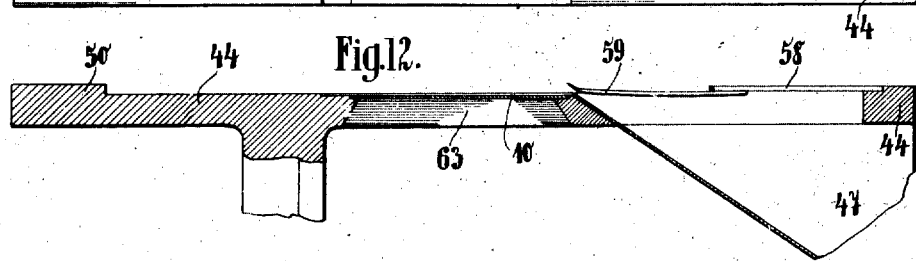
WITNESSES
L. H. Grote
A. E. Powell
INVENTOR
PETER MEYER
by Howson and Howson
Attorneys

UNITED STATES PATENT OFFICE.

PETER MEYER, OF COLOGNE-NIPPES, GERMANY.

SCALE WITH AUTOMATICALLY-ISSUED RECORD-CARDS.

991,343.   Specification of Letters Patent.   Patented May 2, 1911.

Application filed August 3, 1909. Serial No. 511,050.

*To all whom it may concern:*

Be it known that I, PETER MEYER, a subject of the King of Prussia, and residing at Cologne-Nippes, Germany, have invented a new and Improved Scale with Automatically-Issued Record-Cards, of which the following is a specification.

The invention relates to a scale (for persons) adapted to automatically issue record cards and in which either by means of a dial train or directly by the action of the weight, an index formed as a stamp, is actuated so as to produce on a card taken automatically from a storage receptacle and provided with weight divisions, a sign corresponding to its position. The load to be weighed is made to do the work of printing the cards and issuing them. For this purpose there is articulated to the actual weighing platform, an auxiliary platform, which for the purpose of preventing erroneous weight indications, acts on the card printing and card issuing mechanism independently of the weighing mechanism.

Figure 3:
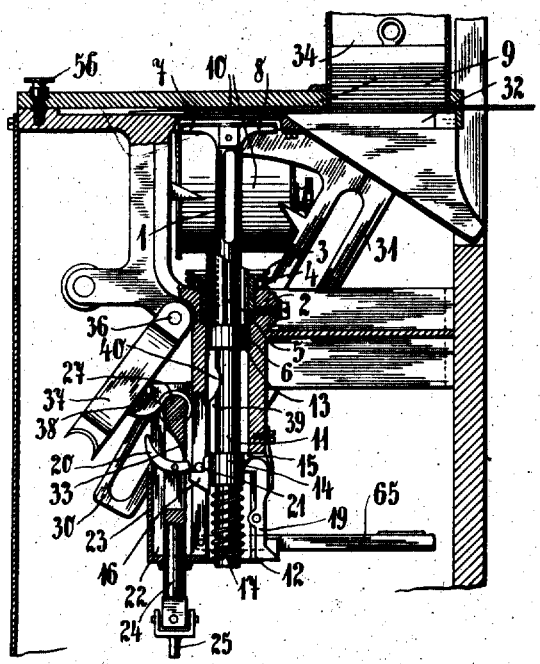
Figure 4:
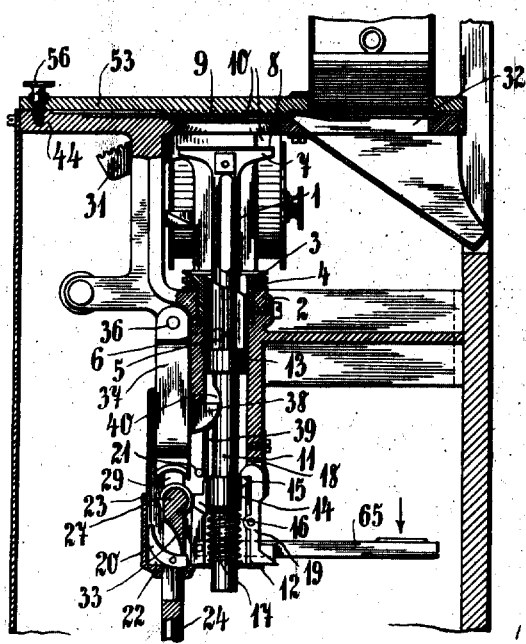

In the accompanying drawings in which the subject of the invention is embodied in one form by way of example, Figure 1 is a side elevation of the scale; Figs. 2–4 show the card printing and issuing mechanism; Fig. 2 being a side elevation thereof; Fig. 3 is a vertical section, while Fig. 4 is a similar section the parts in a changed position; Figs. 5 to 12 show the arrangement for the feeding and ejecting of the cards; Figs. 5 and 6 being vertical sections through the center with the parts in different position; Fig. 7 is a side elevation of the upper guide plate with card holder; Fig. 8 is a plan of the upper guide plate; Fig. 9 is a bottom plan of the slide; Fig. 10 is a section of the slide on the line A—B, Fig. 9; Fig. 11 is a plan of the lower guide; and Fig. 12 a vertical section thereof, and Fig. 13 is a vertical section of a detail.

In the construction illustrated the scale is provided with a dial train and is automatically operated.

For the transmission of the movement of the dial train to the printing stamp 1, there is arranged on the upper end of a cylindrical casing part 2, a disk 3 which is connected to the dial train by a pull rope arranged to actuate the disk 3 upon the rotation of the indicator over the dial plate. In order to decrease friction it is supported on ball bearings. The transmission of motion to the printing stamp is illustrated in Fig. 13. On the axis 70 of the dial indicator is arranged a pulley 66 connected to the disk 3 by the pull cord 67 passing over the pulley 69 on the casing 68. A wedge arranged in the interior of the hub of disk 3, and not shown in the drawing, engages with a corresponding longitudinal groove 5 of the lower guide 6 of the printing stamp, so that the latter may be displaced axially, but is secured against rotation relative to disk 3. The head 7 of the printing stamp 1 carries an arrow 8 as the printing type, which when the printing stamp springs upward, is printed on a card 9 above the same provided with a circular scale of weights in the position corresponding each time to the position occupied by the printing stamp. Below the card is an ink ribbon 10, which is moved on whenever a card is issued. Below the printing stamp there is a rod 11 which is carried on the one hand through a plate 12 closing off the cylindrical casing part 1 at the bottom, and on the other hand, through the upper piston shaped part 13 carrying the printing stamp 1.

To the central part of rod 11 is tightly fixed a ring 14 with two projections 15 and 16. Between ring 14 and plate 12 there is a spiral spring 17. The one projection 15 serves in connection with pawl 19 which is subjected to the action of a plate spring 18, to keep spring 17 and thereby rod 11 under tension, when the latter has been carried downward, while projection 16 serves as the point of contact for a two-armed lever 20 and furthermore to limit the rise of rod 11, as it strikes against a stop 21 when the rod springs upward.

The cylindrical casing 2 is extended at the bottom to form a lateral part 22, which is partially closed by a wall 23, and receives in this part a shaft 24, which is in connection by a system of articulated rods 25 (Fig. 1) with the auxiliary platform 26 pivotally connected to the platform 64 and is drawn down when a weight is put on the scale. To the upper end of the shaft is attached a cross piece 27, which, with its ends preferably provided with the rollers 28, passes through the vertical slots 29 in the side walls of the casing part 22 and at the same time engages in slots 30 of two toothed segments 31 pivoted on both sides on the cylindrical casing 2 and serving for the actuation of slide 32 and the feeding of the ink ribbon 10.

Close to its upper end the shaft 24 is slotted. In this slot there is pivoted the two-armed lever 20 above mentioned. The shorter arm of the same ordinarily bears against the upper wall 33 of the slot (Fig. 3). In the downward movement, it catches projection 16 and thereby depresses the rod 11. If the latter has moved so far down that pawl 19 engages with projection 15, then in the farther downward movement of shaft 24 the longer arm of lever 20 will strike against wall 23. The lever is thereby turned and drawn out of reach of projection 16, so that it passes the same and will reach under maximal load the position shown in Fig. 4. By the rod system moving downward with the auxiliary platform 26 when a weight is put on the scale, the toothed segment 31 is first turned, and thereby, as explained farther on, a card is taken from a supply holder 34 and brought to the printing point, whereby in any known manner, the ink ribbon is also fed, and secondly, the spring rod 11 is depressed. By these two operations the weighing mechanism is not influenced. After the tooth segments 31 have turned, the straight parts of slots 30 cover those (29) located in casing 22, and after the rod 11 has been depressed, the actuating lever 20 is moved out of reach of projection 16, so that the rod system meets with no hindrance in the farther downward movement.

The springing up of the printing stamp 1 and the printing of the arrow is effected, as soon as pawl 19 is raised out of reach of projection 15. This may be done either by hand, or, if the scale, as in the present case, is to be employed as an automaton, by a coin thrown in and acting by say, a longer lever 65 on pawl 19.

When the weight is removed from the scale, the auxiliary platform 26 will return under the influence of a spring 35, to its original position, in which all parts occupy the relative positions shown in Fig. 2. At the same time shaft 24 moves upward and the toothed segments 31 are turned back so that a card is thrown out.

In order to prevent the removal of an unprinted card by, for example, children playing with the apparatus and who might step on and then release the scale, without throwing in any coin, there is arranged, suspended from and freely oscillating about axle 36 a locking device 37, which is hollowed out at its lower end against which the rounded cross piece 27 bears, and carries at its center a projection 38. This coöperates with a projection 39 arranged on rod 11. Above the latter a recess 40 is formed in the rod, which renders it possible for the locking device 37 to take the position shown in Fig. 4.

The slide mechanism for taking the cards from the supply holder, for transmitting the same to the printing point and for their issuance after printing is as follows:—The main part of the same is formed by the slide 32 with the slide plates 41, 42 (Figs. 9 and 10). The former is actuated by toothed rods 43, which lie on both sides of the slide course 44, and guide the slide and are in engagement with the tooth segments 31. The card 9 (Figs. 5 and 6) is caught by the narrow surface 45 of the slide, (Fig. 9), pushed to the printing point and conveyed in the return movement to the issuing point 47 by the narrow surface 46. The movement of the slide is limited in the one direction (forward) by a shoulder 48 (Figs. 5 and 9) which at 49 (Figs. 5 and 11) strikes against the body of the slide course 44, and in the other direction by a part 50 projecting from the slide surface (Fig. 12) which is formed semi-circular to correspond to the recess 51 (Fig. 9) of the slide. The printing point is located above the ink ribbon 10 (Fig. 12) which slants across the sliding course 44 of the slide. It also crosses the toothed rods 43 of the slide, which are provided with longitudinal slots 52 through which the ribbon passes. The toothed rods 43 guide the slide only laterally. In order to also guide it in its plane and in order to form over the printing point a solid background, I provide a guide plate 53 at the printing point into which is also set the card holder 34. The guide plate is fastened by the pins 54 (Fig. 7) which fit into the openings 55 (Fig. 6) provided in the slide course 44, and by the hand screw 56. The small end plate of the guide plate which holds the pins 54 has a slot 57 for the passage of the slide. When the slide moves to the left from the position shown in Fig. 5, surface 45 will catch the lowest card of the stack of cards and convey it into the position shown in Fig. 6, in which it lies on the ink ribbon 10. From this position the cards must be conducted in the return movement to the point of issuance 47. Plate springs 59 attached to the dividing wall 58 (Fig. 11) separating the card holder from the point of issuance serve for this purpose.
These are bent upwardly, in the present case into the openings 60 (Figs. 7 and 8) provided in the guide plate 53 and therefore project into the path of the slide. In the conveyance to the point of printing, the card therefore depresses springs 59 and in this maner procures for itself a free passage to the point of printing. If however the card goes beyond the forward ends of the plate springs, the latter will rise and bear against the beveled surfaces 61 (Fig. 9) of the slide. If now the slide, and with it the card, is moved back, the latter can only follow the path to the issuance point 47 since the springs oppose its movement in any other direction.

In order to guide the card more reliably from the card holder to the point of issuance below the same, the card can, as in the form of construction shown in the drawing, as an example, be somewhat lowered in its path to the printing point. For this purpose the guide plate 53 has at its lower side, the one turned toward the printing point, a rounded elevation 62 and the guide plates 41, 42 successively conveying the card through the narrow surfaces 45 and 46 no longer lie in one plane, but apart by the distance corresponding to the height of the elevation 62. As shown in Fig. 6, elevation 62 forms a solid background for the card lying at the printing point, when the printing stamp passing through the circular opening 63 of the slide course 44 strikes against the ink ribbon, to print the card.

The mode of operation is as follows:— By weighing down the auxiliary platform 26, the rod system 25 and by this the shaft 24 is moved downwardly. By this the tooth segments 31 are first turned by the cross piece 27. They carry along slide 32, thereby take a card from the supply holder 34 and bring it to the point of printing over the printing stamp 1. At the same time lever 20 catches projection 16 and depresses spring rod 11. Pawl 19 engages projection 15 and holds the spring rod 11 in the state of tension. In its farther downward movement, the lever strikes against wall 23 of the casing part 22, is turned and goes out of reach of projection 16. All this takes place at once after stepping or putting a load on the scale, before the load can act on the weighing mechanism. Only after the card has been brought to the printing point and the spring rod 11 is under tension, does the actuation of the weighing mechanism begin. Then the cross piece 27 is no longer opposed in its farther downward movement. Under the action of the load, the rod system continues to descend so that the shaft 24 goes down still farther, lever 20 sliding downward along the inner side of the wall 23. In the downward movement of the shaft, the locking device takes the position shown in Fig. 4, in which it locks against the return of the shaft. If the load is taken from the scale without previously inserting a coin, the consequence would be that the cross piece 27, which would again move upward under the action of the spring 35 beneath the auxiliary platform, bears against the locking device 37. Shaft 24 could not move up, and the tooth segment 31 could not therefore be turned back, so that the card already at the printing point could not be thrown out. If however a coin is inserted, the weight thereof acts on the long lever 65, pawl 19 is disengaged from the projection 15, rod 11 thrusts the printing stamp upward, the latter having been previously and simultaneously turned to same angle as the indexes of the scale, likewise springs upward and strikes against the ink ribbon, whereby an impression on the card is produced in a predetermined position with relation to its scale. When the rod moves up, (its rise being limited by stop 21) the locking device 37 has been moved aside by the projection 39 and in swinging back rests on the vertical part of projection 39, so that it can no longer bar the return of shaft 24. When taking the load off the scale, shaft 24 will therefore move upward without hindrance under the action of spring 35. In this movement, the tooth segments 31 and with these the slide 32 are brought back into the position shown in Fig. 2, whereby the printed card is thrown out.

I claim as my invention:

1. A weighing scale having a rotary indicator displaceable axially and formed as a stamp, means actuated by the load for rotating said indicator, a supply of record cards, means for automatically bringing one of said cards into definite relation to said indicator, and means actuated by the load supporting means for recording the position of said indicator upon the record card together with means for automatically discharging the record card after it has received the imprint of said indicator.

2. A scale having a weighing platform, a rod system connected thereto at one end and provided at the other end with a guided cross piece, toothed segments with cam slots in which said cross piece works, a printing mechanism, and means in connection with said segments for conveying a record card to and from said printing mechanism.

3. A scale having a weighing platform, a rod system connected thereto at one end, a pawl carried by said rod system, a record printing device and a spring for actuating the same, said spring having a movable abutment against which said pawl impinges tensioning the spring upon the movement of said rod system, together with a fixed stop in the path of said pawl serving to disengage the same from said abutment.

4. A weighing scale having a record printing device comprising a rotary indicator displaceable axially, means actuated by the load for rotating said indicator, a spring rod controlling the axial displacement of said indicator, means for placing a record card in definite relation to said indicator, means for bringing said spring rod under tension, and means for releasing said rod while under tension whereby said rod is actuated by its spring, the indicator displaced and an imprint thereof upon said card is secured.

5. A weighing scale having a weighing platform and a card printing mechanism arranged in connection therewith and comprising a rotary indicator displaceable axially, means actuated by the load for rotating said indicator; and means for axially displacing the latter to secure an imprint therefrom, in combination with a holder for a stack of record cards and means for automatically taking a card from said stack, presenting it to the printing mechanism and ejecting it after the printing of an impression thereon.

6. A scale having a weighing platform and a card record printing mechanism arranged in connection therewith, means for operating the printing mechanism by the weighing platform, in combination with a holder for a stack of record cards arranged above the discharge outlet for the printed card, and separated therefrom by an intermediate wall terminating in plate springs at the end adjacent the printing point, together with means for automatically forcing a card from the pack past said springs to the printing mechanism and subsequently ejecting the printed card at the discharge outlet, said card being guided by said springs on its ejection beneath the intermediate wall above referred to.

7. A scale having a weighing platform and a card record printing mechanism arranged in connection therewith, means for operating the printing mechanism by the weighing platform, in combination with a holder for a stack of record cards, and slide plates arranged in different planes and means in connection therewith for automatically taking a card from said stack, presenting it to the printing mechanism and ejecting it after the printing of an impression thereon.

In testimony whereof I have signed my name to this specification, in the presence of two subscribing witnesses.

PETER MEYER.

Witnesses:
F. L. MARTINY,
M. KNEPPERS.